United States Patent
Vandervort

(10) Patent No.: US 9,967,091 B2
(45) Date of Patent: May 8, 2018

(54) METHOD FOR ENHANCING SECURITY IN DISTRIBUTED SYSTEMS

(71) Applicant: Xerox Corporation, Norwalk, CT (US)

(72) Inventor: David R. Vandervort, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 332 days.

(21) Appl. No.: 14/620,235

(22) Filed: Feb. 12, 2015

(65) Prior Publication Data
US 2016/0241392 A1 Aug. 18, 2016

(51) Int. Cl.
*H04L 9/08* (2006.01)
*H04L 9/32* (2006.01)
*H04L 29/06* (2006.01)

(52) U.S. Cl.
CPC .............. *H04L 9/0825* (2013.01); *H04L 9/08* (2013.01); *H04L 9/0819* (2013.01); *H04L 9/3226* (2013.01); *H04L 63/00* (2013.01); H04L 2209/56 (2013.01)

(58) Field of Classification Search
CPC ....... H04L 9/08; H04L 9/0819; H04L 9/0825; H04L 2209/56
See application file for complete search history.

(56) References Cited

U.S. PATENT DOCUMENTS

| | | | | |
|---|---|---|---|---|
| 9,015,479 | B2 * | 4/2015 | Jogand-Coulomb | ... G06F 21/10 380/277 |
| 9,135,787 | B1 * | 9/2015 | Russell | ................. G07F 19/201 |
| 2003/0147536 | A1 * | 8/2003 | Andivahis | ............... H04L 63/06 380/277 |
| 2008/0130902 | A1 * | 6/2008 | Foo Kune | ............. H04L 63/062 380/286 |
| 2009/0310783 | A1 * | 12/2009 | Kokku | ............... G06Q 20/3672 380/255 |
| 2010/0172504 | A1 * | 7/2010 | Allen | .................... H04L 9/0825 380/286 |
| 2010/0250359 | A1 * | 9/2010 | Gillenson | .............. G06Q 30/02 705/14.25 |
| 2013/0218753 | A1 * | 8/2013 | Oikonomidis | ......... G06Q 20/22 705/39 |
| 2013/0339155 | A1 * | 12/2013 | Yerli | .................. G06O 30/0241 705/14.66 |
| 2015/0363876 | A1 * | 12/2015 | Ronca | .................... G06Q 40/04 705/37 |

(Continued)

*Primary Examiner* — Linglan E Edwards
(74) *Attorney, Agent, or Firm* — Michael J. Nickerson; Basch & Nickerson LLP

(57) ABSTRACT

A method and system secures an encryption key for utilization on a secured network by receiving, at a trusted node, an encryption key request from a requesting node, the encryption key request including a public encryption key of a public/private encryption key pair associated with the requesting node; determining, at the trusted node, if the requesting node has previously supplied enough virtual currency to support the request; choosing an encryption key for distributing to the requesting node when it is determined the requesting node has enough virtual currency; encrypting the chosen encryption key with the public encryption key of a public/private encryption key pair associated with the requesting node; and sending the encrypted encryption key to the requesting node.

10 Claims, 4 Drawing Sheets

(56) References Cited

U.S. PATENT DOCUMENTS

| | | | |
|---|---|---|---|
| 2016/0021171 A1* | 1/2016 | Zourzouvillys | H04L 67/10 709/207 |
| 2016/0148198 A1* | 5/2016 | Kelley | G06Q 20/3678 705/69 |
| 2016/0203448 A1* | 7/2016 | Metnick | G06Q 20/065 705/64 |

* cited by examiner

METHOD FOR ENHANCING SECURITY IN DISTRIBUTED SYSTEMS

BACKGROUND

Conventional distributed systems, such as database services and/or systems distributed over a network or networks, frequently depend on the coordinated working of multiple instances of some software, usually running on separate computers connected by a network. These conventional distributed databases, such as NoSQL databases, spread data across a number of computers (called nodes), resulting in queries against that data being across the nodes.

These distributed database systems are subject to potential security issues, such as the interception of data being transmitted between nodes, the interception of commands between nodes, and/or the attaching of false nodes to the system. With respect to the false or "spoofed" nodes, these false nodes can pretend to be legitimate, taking part in all transactions, thereby potentially stealing or corrupting data or simply preventing it from being effectively processed.

Many conventional distributed database systems essentially ignore these problems, counting on administrators to secure the environment where the distributed nodes run.

For example, one conventional distributed database recommends the restricting of communication port access only to known friendly nodes with a firewall. Restricting communication port access requires that there be tight control over the network and increases the management overhead in setting up these distributed database systems. However, in situations where nodes are created in the cloud in order to quickly scale, this level or type of protection is problematic.

The problem of working in the cloud can be partially mitigated by encrypting communication between nodes, including the commands that add new nodes.

Secure communication, using encryption, between nodes requires the communicating nodes to share an encryption key that is kept secret from the rest of the world. Theft or corruption of encryption keys compromises communication and puts the data at risk, just as surely as if it was never encrypted at all.

Although encryption may mitigate problems associated with communicating between nodes, the issue of verifying a node (trust) before allowing the node to become a member of the distributed system and receiving an encryption key cannot be easily resolved relying solely on encryption.

In other words, encryption alone cannot verify a node as trustworthy before the node is given encryption keys.

Moreover, encryption alone does not address the issue of exchanging encryption keys with some certainty that only trusted systems (nodes) possess them.

In the discussion above, encryption refers to the use of mathematical methods to convert ordinary text into a form that is unreadable. The transformation of the ordinary text into a form that is unreadable depends on an encryption "key" which is conventionally a random string of characters. With the correct encryption key, the original form of a message can be decrypted (recovered from the encrypted form).

Conventionally, there are two methods of encryption using different types of encryption keys: symmetric encryption and asymmetric encryption.

Symmetric encryption uses the same encryption key to encrypt a message and to decrypt the message. Using the same encryption key for both encryption and decryption enables a faster encryption/decryption process, thereby allowing the system to handle a large volume of message traffic.

On the other hand, when using symmetric encryption, both sides of the exchanged message need to know the encryption key. Thus, if the purpose of encrypting a message is to hide it from others, the symmetric encryption key should be revealed only to those who need it and hidden from all others, thereby raising security issues with respect to securely distributing keys only to trusted recipients.

Asymmetric encryption uses two encryption keys that are mathematically related to each other in such a way that anything encrypted by one encryption key can be decrypted only by the other encryption key. In asymmetric encryption, the encryption key used to encrypt the message cannot decrypt the message.

The encryption keys used in asymmetric encryption are referred to as a public/private key pair because the relationship between the encryption keys allows one to be given freely to anyone and the other to be kept secret by the owner. Anyone can use the public key of the asymmetric encryption key pair to encrypt a message that can only be decrypted by the owner of the private key of the asymmetric encryption key pair.

Although the asymmetric encryption situation provides a more secure method of distributing encryption keys to the desired users, a drawback of asymmetric encryption is that asymmetric encryption/decryption takes considerably more computing resources than symmetric encryption/decryption, making the asymmetric encryption/decryption process slow and not appropriate for situations handling a large volume of message traffic.

Thus, it is desirable to provide a system for communicating between nodes, which is secure and fast.

Moreover, it is desirable to provide a system for communicating between nodes, which reduces the chances of an untrusted node potentially stealing or corrupting data or simply preventing it from being effectively processed.

Furthermore, it is desirable to provide a system for communicating between nodes, which is secure and fast and which reduces the chances of an untrusted node potentially stealing or corrupting data or simply preventing it from being effectively processed.

BRIEF DESCRIPTION OF THE DRAWING

The drawings are only for purposes of illustrating various embodiments and are not to be construed as limiting, wherein.

DETAILED DESCRIPTION

Figure 1:
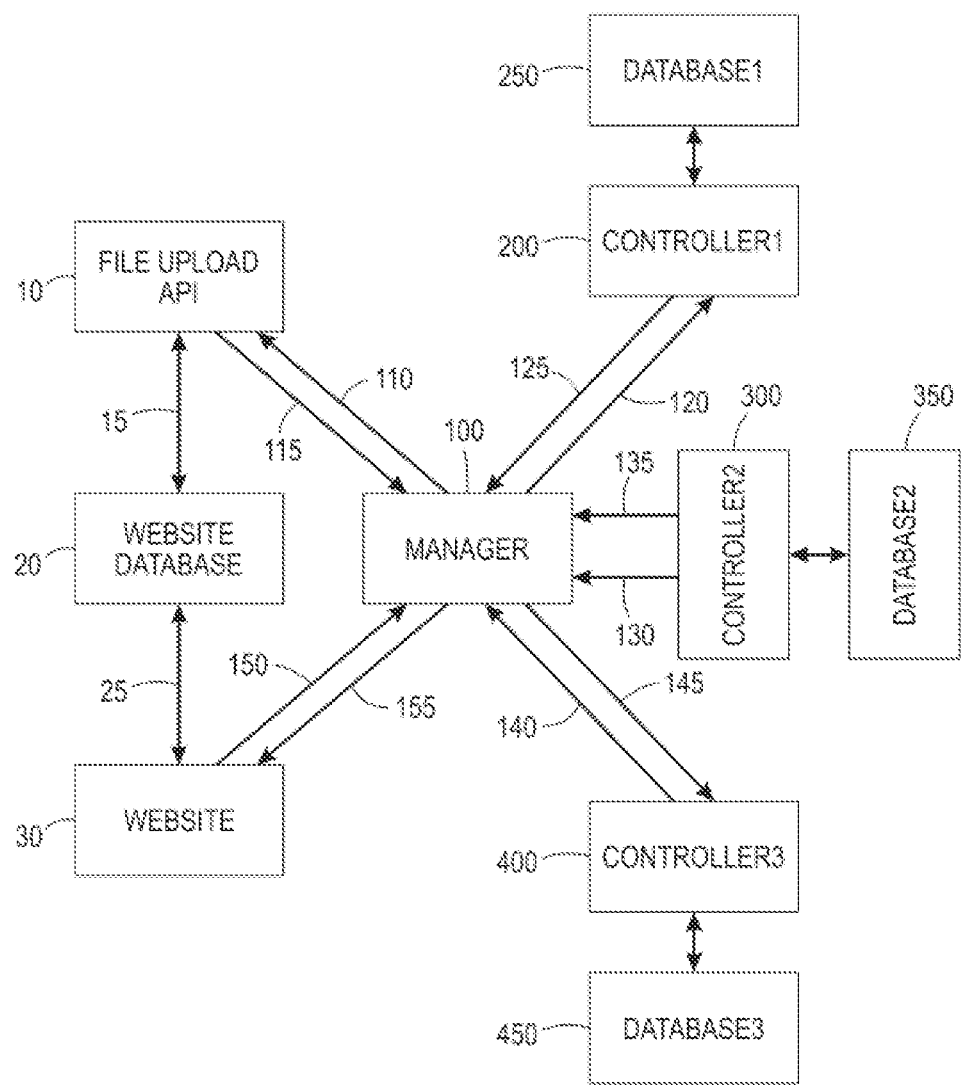
FIG. 1 is a block diagram illustrating a secured networked system for transferring information between nodes.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

In the various embodiments below, a node is a physical location that includes a computing device, a storage device, and a connection to a communication network, such as a local area network, a wide area network, the internet, the cloud, etc.

In the various embodiments below, a virtual node electronically represents a physical location that includes a computing device, a storage device, and a connection to a communication network, such as a local area network, a wide area network, the internet, the cloud, etc.

FIG. 1 illustrates a secured networked system for transferring information between nodes. As illustrated in FIG. 1, a manager 100 is connected to various databases (database1 250, database2 350, and database3 450) through controllers (controller) 200, controller2 300, and controller3 400). The manager 100 may also be connected to a file upload API 10 and a website 30. The file upload API 10 and website 30 are connected to a website database 20.

The communications (125 and 120) between the manager 100 (node) and the controller 200 (node) are encrypted using encryption keys. The communications (135 and 130) between the manager 100 (node) and the controller 300 (node) are encrypted using encryption keys. The communications (145 and 140) between the manager 100 (node) and the controller 400 (node) are encrypted using encryption keys.

The controllers (controller) 200, controller2 300, and controller3 400) encrypts the information received from the associated databases (database1 250, database2 350, and database3 450) before communicating the information to the manager 100. Moreover, the controllers (controller) 200, controller2 300, and controller3 400) decrypts the information received from the manager 100 before communicating the information to the associated databases (database1 250, database2 350, and database3 450).

It is noted that the manager 100 is associated with the website 30 and the file upload API 10, and the manager 100 provides the encryption and decryption functionality for the website 30 and the file upload API 10, as well as, the gatekeeping for the website 30 and the file upload API 10.

With respect to establishing the encryption communications between the nodes (manager 100 and controllers (200, 300, and 400)), the exchange of an encryption key includes the use of a virtual currency.

As illustrated in FIG. 1, the manager 100 is the only node that communicates to the other nodes; thus, the manager 100 is the node that manages the keys for other nodes.

A manager/controller/system architecture is a relatively simple architecture for controlling heterogeneous systems; such as databases, analytics engines, etc.

However, it is noted that a manager node is not needed, though there could be one manager node or even many manager nodes.

The utilization of virtual currency works in a completely distributed system in which all nodes are equal, or in a semi-peer-to-peer system in which some nodes act as local managers.

It is further noted that the number and type of nodes in a network that manages and/or "sell" keys is related to the architecture needs.

For example, in some implementations, all nodes might manage the keys and in other implementations, only a subset of all the nodes may manage the keys.

Figure 2:
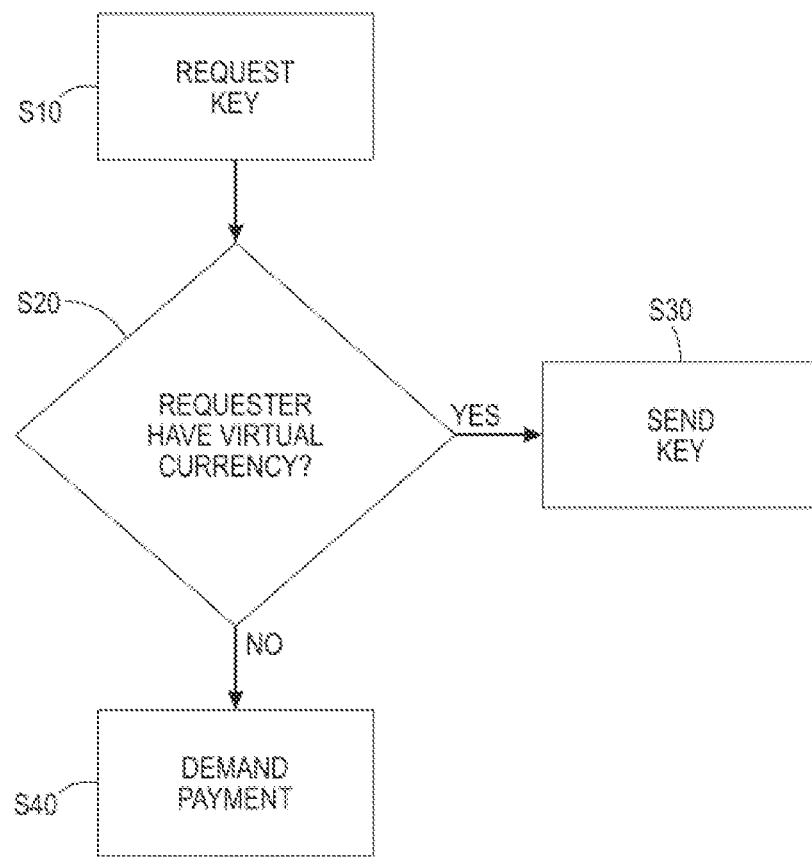
FIG. 2 is a flowchart showing an embodiment for securing an encryption key for utilization on the secured network of FIG. 1.

FIG. 2 illustrates a flowchart showing an embodiment for securing an encryption key for utilization on a secured network (system). As illustrated in FIG. 2, a node requests an encryption key from another node on the system, as step S10. The node receiving the encryption key request determines if the requesting node has previously supplied enough virtual currency to support the request, at step S20.

The node receiving the encryption key request, at step S20, may review the virtual wallet associated therewith to determine if the requesting node has previously supplied enough virtual currency to secure the requested encryption key. If the requesting node has the appropriate amount of virtual currency to secure the requested encryption key, the node receiving the encryption key request, at step S30, sends the encryption key to the requesting node.

If the requesting node does not have the appropriate amount of virtual currency to secure the requested encryption key, the node receiving the encryption key request, at step S40, sends a payment demand to the requesting node.

The node receiving the encryption key request does not release or send an encryption key to the requesting node until the requesting node has the appropriate amount of virtual currency to secure the requested encryption key.

In this embodiment, the encryption key may be a symmetric encryption key or an asymmetric encryption key.

Figure 3:
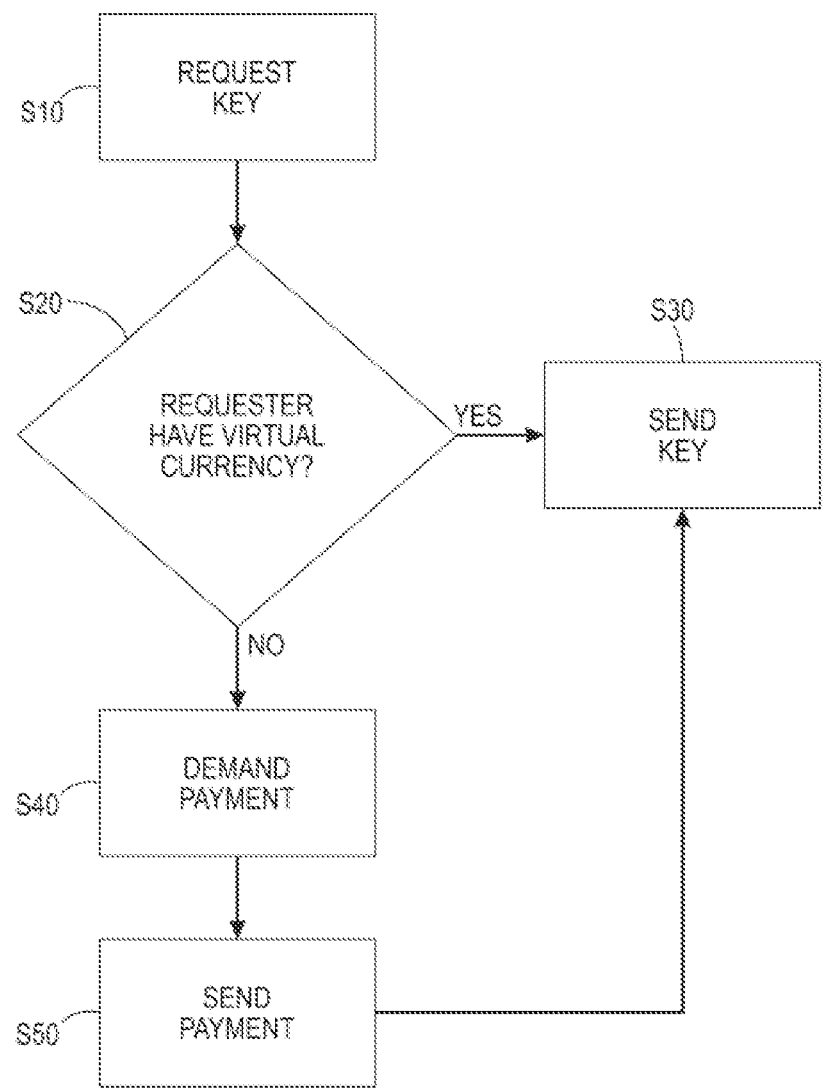
FIG. 3 is a flowchart showing another embodiment for securing an encryption key for utilization on the secured network of FIG. 1.

FIG. 3 illustrates a flowchart showing another embodiment for securing an encryption key for utilization on a secured network (system). As illustrated in FIG. 3, a node requests an encryption key from another node on the system, as step S10. The node receiving the encryption key request determines if the requesting node has previously supplied enough virtual currency to support the request, at step S20.

The node receiving the encryption key request, at step S20, may review the virtual wallet associated therewith to determine if the requesting node has previously supplied enough virtual currency to secure the requested encryption key. If the requesting node has the appropriate amount of virtual currency to secure the requested encryption key, the node receiving the encryption key request, at step S30, sends the encryption key to the requesting node.

If the requesting node does not have the appropriate amount of virtual currency to secure the requested encryption key, the node receiving the encryption key request, at step S40, sends a payment demand to the requesting node.

In response to the payment demand, the requesting node sends, at step S50, the appropriate payment to the node requesting payment. After receiving the appropriate payment, the node receiving the encryption key request releases or sends, at step S30. If the appropriate payment is not received, the node receiving the encryption key request does not release or send an encryption key to the requesting node until the requesting node has sent the appropriate amount of virtual currency to secure the requested encryption key.

In this embodiment, the encryption key may be a symmetric encryption key or an asymmetric encryption key.

Figure 4:
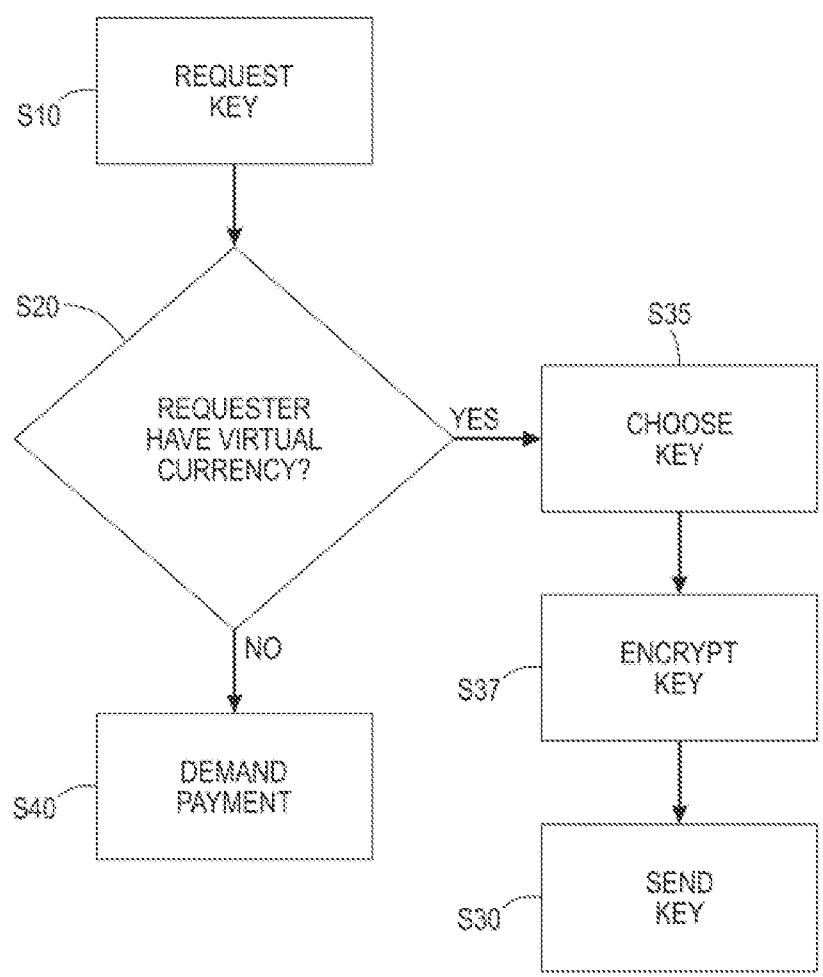
FIG. 4 is a flowchart showing a third embodiment for securing an encryption key for utilization on the secured network of FIG. 1.

FIG. 4 illustrates a flowchart showing a third embodiment for securing an encryption key for utilization on a secured network (system). As illustrated in FIG. 4, a node requests an encryption key from another node on the system, as step S10. The node receiving the encryption key request determines if the requesting node has previously supplied enough virtual currency to support the request, at step S20.

The node receiving the encryption key request, at step S20, may review the virtual wallet associated therewith to determine if the requesting node has previously supplied enough virtual currency to secure the requested encryption key. If the requesting node has the appropriate amount of virtual currency to secure the requested encryption key, the node receiving the encryption key request, at step S35, chooses an encryption key to send to the requesting node. The chosen encryption key is encrypted, at step S37, using asymmetric encryption, so that the transmission of the chosen encryption key is secured. The node receiving the encryption key request then sends, at step S30, the encrypted encryption key to the requesting node.

If the requesting node does not have the appropriate amount of virtual currency to secure the requested encryption key, the node receiving the encryption key request, at step S40, sends a payment demand to the requesting node.

In response to the payment demand, the requesting node sends, at step S50, the appropriate payment to the node requesting payment. After receiving the appropriate payment, the node receiving the encryption key request releases or sends, at step S30. If the appropriate payment is not received, the node receiving the encryption key request does not release or send an encryption key to the requesting node until the requesting node has sent the appropriate amount of virtual currency to secure the requested encryption key.

In this embodiment, the encryption key is a symmetric encryption key and is encrypted using asymmetric encryption.

Moreover, in this embodiment, simple data transfers between the nodes are protected with symmetric key encryption. However, distribution of the symmetric keys is protected with asymmetric encryption.

The distribution of the symmetric keys with asymmetric encryption assists trusted nodes to receive the needed encryption keys to function, while untrusted nodes can be excluded. Moreover, by adding the additional layer of requiring virtual currency, the barrier to a potential attacker is raised.

In the various embodiments, the term virtual currency describes purely digital forms of money, such as Bitcoin or a host of similar virtual currencies.

A virtual currency is a protocol that creates digital "coins," transfers the digital "coins" from one address to another address and validates the transactions. The protocol is entirely peer-to-peer. The digital (virtual) currency and corresponding transactions are managed in a virtual wallet.

The utilization of virtual currency adds an additional barrier to an untrusted node from obtaining (fraudulently) encryption keys.

More specifically, the encryption keys are obtained by "buying in," using a virtual currency to pay existing nodes for their encryption keys. Since the virtual currency has a real value, any attacker who wishes to communicate within the system needs to spend money up front to acquire the virtual currency, thereby raising the bar for attackers by increasing the cost of entry.

It is noted that although Bitcoin has been identified as a virtual currency, any openly traded virtual currency could be utilized.

Moreover, it is noted that the encryption system could utilize a self-created virtual currency that is not openly traded but is only used within the system. The self-created virtual currency would force attackers to seek to attach spoofed nodes to the system to first find a source for the virtual currency.

It is noted that legitimate nodes will have enough currency when the nodes start to be able to buy into the system. Thus, a new node may need to buy several keys, depending on how communication on the network is configured. Since there is no central bank for the virtual currency, setting a starting balance for a new node simply involves sending a payment to the new node's virtual wallet.

It is further noted that once nodes are trusted on the network, or when the nodes receive a payment from a new node, the virtual currency can be passed back to an administrative account. This recycling of the virtual currency helps keep costs down.

It is also noted that by recycling the virtual currency, an attacker attempting to crack a node's wallet in order to buy its own way onto the system will have fewer opportunities since older nodes will no longer have anything to steal.

Once a system is largely in place and little growth is expected (especially when it is in an open environment), the buy-in cost for new nodes can be increased substantially to discourage unwanted nodes. Those provisioned from within the system by harvesting the virtual currency from nodes that no longer need the virtual currency will then have a substantial price advantage over outsiders that must supply the entire cost themselves.

To enforce the use of encryption and the appropriate keys, all communication between nodes should take place across a defined interface.

Each node should have a public/private key pair in order to encrypt messages involving the transfer of the symmetric keys that are used to protect the majority of message traffic. The public key is made freely available to any system that requests it, especially systems that are not yet accepted as nodes of the distributed system. If a public/private key pair is not utilized, when a symmetric key is sent to a node that has newly joined the system, the key would be unencrypted and vulnerable to theft from attackers watching network traffic.

When a new node requests one or more encryption keys from an existing node, the virtual currency address of the system (node) making the request and either the address of the requesting node's public key or the key itself is sent with the request.

It is noted that a web address or node identifier may be provided for future transactions since one of the characteristics of virtual currencies is that addresses can frequently change in order to protect the privacy of those involved in transactions.

It is noted that the request should be encrypted with the public key of the system (node) receiving the request.

If there is a record of sufficient payment (amount of virtual currency), the receiving node will distribute one or more of the encryption keys (synchronous type) needed to act as a node of the system. The distributed encryption keys, for security purposes, should be encrypted using the public key of the requesting system (node) found in the initial encryption key request.

If payment has not been received, a price and currency as well as the address to make payments to, will be returned. An example, in JSON format might look like the following:
{"status": "fail", "reason": "non payment", "price": 3.5, "currency": "Bitcoin", "pay_to_address": 'XXXXXXXXXXXXXXXXXXXXXXXX'}

The distributed encryption keys should be encrypted with the public key of the system (node) requesting a (secret, synchronous) key that was linked or included in the request itself. This enables that only the intended receiving system will be able to decipher the result.

The distributing of the encryption keys enables the transference of data between the nodes within the system to be trusted.

The utilization of the encryption system described above allows the creation of a distributed platform that gives users simple, Internet-based access to complex and diverse analytic systems.

In addition, the utilization of the encryption system described above can frustrate a network eavesdropper (potential attacker) by encryption of all data, including commands from the manager, as it flows between nodes. Although encryption produces overhead and slows down throughput to some extent, the use of synchronous (shared key) encryption minimizes the slow down as much as possible while preserving security.

Furthermore, the utilization of the encryption system described above prevents the registration of false nodes with the manager. Also, the utilization of the encryption system described above prevents false managers from effectively sending commands to existing nodes because the false managers do not possess the shared keys necessary to encrypt the communication.

If a node wishes to gain the encryption keys, the node needs to have sufficient amounts of the virtual currency accepted by the system. When a legitimate administrator of the system wishes to add a new node, the node secures sufficient currency to buy its way into the network.

The utilization of the encryption system described above encrypts communications while increasing the difficulty and, in some implementations, the actual dollar cost of acquiring the encryption keys needed to participate in the system. The use of virtual currency also allows a completely automated system, without the need of a third party such as would be involved in a system where actual currency is utilized, which allows the system to scale more quickly and smoothly as the needs of the system expand.

It is noted that the requirement to buy encryption keys from the network itself, in order to establish trust, is distinctly different from systems that require the purchase of proprietary product activation keys.

It is also noted that the use of virtual currencies provides protection against fraudulent transactions due to the cryptography used to verify payments.

Moreover, it is noted that the ability to choose or even create a virtual currency that suits particular needs for cost and control adds considerable flexibility.

It is further noted that trust is, itself, a premium currency when dealing with highly scalable systems, especially when customer data is involved. The utilization of the encryption system described above enhances trust with economic incentives and an encrypted communication interface that insulates vulnerable systems nodes from potentially hostile communication.

In summary, a method for securing an encryption key for utilization on a secured network includes receiving, at a trusted node, an encryption key request from a requesting node; determining, at the trusted node, if the requesting node has previously supplied enough virtual currency to support the request; and sending an encryption key, from the trusted node, to the requesting node when it is determined the requesting node has previously supplied enough virtual currency to make such a request.

The method may demand a payment from the requesting node when it is determined the requesting node does not have enough virtual currency to make such a request.

The encryption key may be a symmetric encryption key or an asymmetric encryption key.

The encryption key request may include a virtual currency address of the requesting node.

A method for securing an encryption key for utilization on a secured network includes receiving, at a trusted node, an encryption key request from a requesting node, the encryption key request including a public encryption key of a public/private encryption key pair associated with the requesting node; determining, at the trusted node, if the requesting node has previously supplied enough virtual currency to support the request; choosing an encryption key for distributing to the requesting node when it is determined the requesting node has previously supplied enough virtual currency to make such a request; encrypting the chosen encryption key with the public encryption key of a public/private encryption key pair associated with the requesting node; and sending the encrypted encryption key, from the trusted node, to the requesting node.

The method may demand a payment from the requesting node when it is determined the requesting node does not have enough virtual currency to make such a request.

The encryption key may be a symmetric encryption key.

The encryption key request may include a virtual currency address of the requesting node.

A system for securing an encryption key for utilization on a secured network includes a node capable of distributing encryption keys for utilization on a secured network; and a requesting node. The requesting node sends an encryption key request to the node capable of distributing encryption keys for utilization on a secured network, the encryption key request including a public encryption key of a public/private encryption key pair associated with the requesting node. The node capable of distributing encryption keys for utilization on a secured network determines if the requesting node has previously supplied enough virtual currency to support the request; chooses an encryption key for distributing to the requesting node when the node capable of distributing encryption keys for utilization on a secured network determines the requesting node has enough virtual currency to make such a request; encrypts the chosen encryption key with the public encryption key of a public/private encryption key pair associated with the requesting node; and sends the encrypted encryption key to the requesting node.

The system may demand a payment from the requesting node when the node capable of distributing encryption keys for utilization on a secured network determines the requesting node does not have enough virtual currency to make such a request.

The encryption key may be a symmetric encryption key.

The encryption key request may include a virtual currency address of the requesting node.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for providing trusted transference of data, using an encryption key, on a secured network, the secured network being comprised of member computers, each member computer having a microprocessor and an associated storage device, comprising:

(a) receiving, at a first computer, the first computer being one of the member computers of the secured network, an encryption key request from a second computer having a microprocessor and an associated storage device, the second computer not being one of the member computers of the secured network, the first computer of the secured network having the encryption key for utilization on the secured network;

(b) determining, by the first computer, if the second computer has at least a predetermined amount of digital money associated with a self-created virtual currency, associated the second computer, to fulfill the encryption key request, the self-created virtual currency being a peer-to-peer protocol that transfers of the digital money associated with the self-created virtual currency from one internet protocol address on the secured network to another internet protocol address on the secured network and validates the transfers, the self-created virtual currency being only used within the secured network;

(c) sending, from the first computer of the secured network to the second computer, a payment request for the predetermined amount of digital money associated with the self-created virtual currency;

(d) sending an encryption key, from the first computer of the secured network to the second computer, when the first computer receives from the second computer the predetermined amount of digital money associated with the self-created virtual currency to fulfill the encryption key request;

(e) sending, from the first computer of the secured network to the second computer, a payment demand when the first computer determines that the second computer does not have at least the predetermined amount of digital money associated with the self-created virtual currency to fulfill the encryption key request;

(f) sending an encryption key, from the first computer of the secured network to the second computer, when the first computer receives, from the second computer, an appropriate payment associated with the sent payment demand;

(g) enabling, in response to the encryption key being sent by the first computer to the second computer, trusted transference of data from the second computer to the first computer and trusted transference of data from the first computer to the second computer;

(h) enabling, in response to the encryption key being sent by the first computer to the second computer, trusted transference of data between the second computer and a third computer and trusted transference of data from the third computer to the second computer, the third computer being one of the member computers of the secured network; and (i) transferring, at the first computer of the secured network, the digital money, received from the second computer of the secured network, associated with the self-created virtual currency to an administrative account to prevent unauthorized acquisition of digital money associated the self-created virtual currency from the second computer of the secured network by an unauthorized computer;

(j) harvesting, at the first computer of the secured network, from other member computers of the secured network, digital money associated with the self-created virtual currency which is no longer needed by the other member computers of the secured network; and (k) transferring, at the first computer of the secured network, the harvested digital money associated with the self-created virtual currency to the administrative account to prevent unauthorized acquisition of digital money associated the self-created virtual currency from the other member computers of the secured network that no longer need digital money associated with the self-created virtual currency by an unauthorized computer.

2. The method as claimed in claim 1, wherein the encryption key is a symmetric encryption key.

3. The method as claimed in claim 1, wherein the encryption key is an asymmetric encryption key.

4. The method as claimed in claim 1, wherein the encryption key request includes a virtual currency address of the second computer.

5. A method for providing trusted transference of data, using an encryption key, on a secured network, the secured network being comprised of member computers, each member computer having a microprocessor and an associated storage device, comprising:

(a) receiving, at a first computer, the first computer being one of the member computers of the secured network, an encryption key request from a second computer having a microprocessor and an associated storage device, the second computer not being one of the member computers of the secured network, the first computer of the secured network having the encryption key for utilization on the secured network, the encryption key request including a public encryption key of a public/private encryption key pair associated with the second computer;

(b) determining, by the first computer, if the second computer has at least a predetermined amount of digital money associated with a self-created virtual currency, associated the second computer, to fulfill the encryption key request, the self-created virtual currency being a peer-to-peer protocol that transfers of the digital money associated with the self-created virtual currency from one internet protocol address on the secured network to another internet protocol address on the secured network and validates the transfers, the self-created virtual currency being only used within the secured network;

(c) sending, from the first computer of the secured network to the second computer, a payment request for the predetermined amount of digital money associated with the self-created virtual currency;

(d) sending, from the first computer of the secured network to the second computer, a payment demand when the first computer determines that the second computer does not have at least the predetermined amount of digital money associated with the self-created virtual currency to fulfill the encryption key request;

(e) choosing an encryption key for distributing to the second computer when the first computer receives from the second computer the predetermined amount of digital money associated with the self-created virtual currency to fulfill the encryption key request or when the first computer receives, from the second computer, an appropriate payment associated with the sent payment demand;

(f) encrypting the chosen encryption key with the public encryption key of a public/private encryption key pair associated with the second computer;

(g) sending the encrypted encryption key, from the first computer, to the second computer;

(h) enabling, in response to the encrypted encryption key being sent by the first computer to the second computer, trusted transference of data from the second computer to the first computer and trusted transference of data from the first computer to the second computer;

(i) enabling, in response to the encrypted encryption key being sent by the first computer to the second computer, trusted transference of data between the second computer and a third computer and trusted transference of data from the third computer to the second computer, the third computer being one of the member computers of the secured network;

(j) transferring, at the first computer of the secured network, the digital money, received from the second computer of the secured network, associated with the self-created virtual currency to an administrative account to prevent unauthorized acquisition of digital money associated the self-created virtual currency from the second computer of the secured network by an unauthorized computer;

(k) harvesting, at the first computer of the secured network, from other member computers of the secured network, digital money associated with the self-created virtual currency which is no longer needed by the other member computers of the secured network; and (l) transferring, at the first computer of the secured network, the harvested digital money associated with the self-created virtual currency to the administrative account to prevent unauthorized acquisition of digital money associated the self-created virtual currency from the other member computers of the secured network that no longer need digital money associated with the self-created virtual currency by an unauthorized computer.

6. The method as claimed in claim 5, wherein the chosen encryption key is a symmetric encryption key.

7. The method as claimed in claim 5, wherein the encryption key request includes a virtual currency address of the second computer.

8. A system for providing trusted transference of data, using an encryption key, on a secured network, the secured network being comprised of member computers, each member computer having a microprocessor and an associated storage device, comprising:

a first computer having encryption keys for utilization on a secured network, said first computer being one of the member computers of the secured network; and a second computer having a microprocessor and an associated storage device, said second computer not being a member computer of the secured network;

said second computer sending an encryption key request to said first computer, said encryption key request including a public encryption key of a public/private encryption key pair associated with said second computer;

said first computer determining if said second computer has at least a predetermined amount of digital money associated with a self-created virtual currency, associated said second computer, to fulfill the encryption key request, said self-created virtual currency being a peer-to-peer protocol that transfers of the digital money associated with said self-created virtual currency from one internet protocol address on the secured network to another internet protocol address on the secured network and validates the transfers, said self-created virtual currency being only used within the secured network;

said first computer sending, to said second computer, a payment request for said predetermined amount of digital money associated with said self-created virtual currency;

said first computer sending, to said second computer, a payment demand when said first computer determines that said second computer does not have at least said predetermined amount of digital money associated with said self-created virtual currency to fulfill the encryption key request said first computer choosing an encryption key for distributing to said second computer when said first computer receives from said second computer said predetermined amount of digital money associated with said self-created virtual currency to fulfill the encryption key request or when said first computer receives, from said second computer, an appropriate payment associated with the sent payment demand;

said first computer encrypting the chosen encryption key with the public encryption key of a public/private encryption key pair associated with said second computer;

said first computer sending the encrypted encryption key to said second computer;

said encrypted encryption key enabling trusted transference of data from said second computer to said first computer and trusted transference of data from said first computer to said second computer;

said encrypted encryption key enabling trusted transference of data between said second computer and a third computer and trusted transference of data from said third computer to said second computer, said third computer being one of the member computers of the secured network;

said first computer transferring the self-created virtual currency to an administrative account to prevent unauthorized acquisition of the self-created virtual currency from said second computer of the secured network by an unauthorized computer;

said first computer harvesting from other member computers of the secured network, digital money associated with the self-created virtual currency which is no longer needed by the other member computers of the secured network;

said first computer transferring the harvested digital money associated with the self-created virtual currency to the administrative account to prevent unauthorized acquisition of digital money associated the self-created virtual currency from the other member computers of the secured network that no longer need digital money associated with the self-created virtual currency by an unauthorized computer.

9. The system as claimed in claim 8, wherein said chosen encryption key is a symmetric encryption key.

10. The system as claimed in claim 8, wherein the encryption key request includes a virtual currency address of said second computer.

* * * * *